US012578926B2

(12) United States Patent
Ikarashi

(10) Patent No.: US 12,578,926 B2
(45) Date of Patent: Mar. 17, 2026

(54) SECURE SQUARE ROOT COMPUTATION SYSTEM, SECURE NORMALIZATION SYSTEM, METHODS THEREFOR, SECURE COMPUTATION APPARATUS, AND PROGRAM

(71) Applicant: NTT, Inc., Tokyo (JP)

(72) Inventor: Dai Ikarashi, Musashino (JP)

(73) Assignee: NTT, Inc., Tokyo (JP)

(*) Notice: Subject to any disclaimer, the term of this patent is extended or adjusted under 35 U.S.C. 154(b) by 932 days.

(21) Appl. No.: 17/789,787

(22) PCT Filed: Jan. 20, 2020

(86) PCT No.: PCT/JP2020/001674
§ 371 (c)(1),
(2) Date: Jun. 29, 2022

(87) PCT Pub. No.: WO2021/149098
PCT Pub. Date: Jul. 29, 2021

(65) Prior Publication Data
US 2023/0044126 A1 Feb. 9, 2023

(51) Int. Cl.
*G06F 7/552* (2006.01)
*H04L 9/08* (2006.01)

(52) U.S. Cl.
CPC .............. *G06F 7/552* (2013.01); *H04L 9/085* (2013.01)

(58) Field of Classification Search
CPC ....................................................... G06F 7/552
See application file for complete search history.

(56) References Cited

U.S. PATENT DOCUMENTS

2015/0188700 A1* 7/2015 Ben Saied ............ H04L 9/0838
380/44

OTHER PUBLICATIONS

Abdelrahaman Aly et al: "Benchmarking Privacy Preserving Scientific Operations", IACR ePrint, vol. 20190403:061423, Apr. 3, 2019 (Apr. 3, 2019), pp. 1-21, XP061032034.
(Continued)

*Primary Examiner* — Michael D. Yaary
(74) *Attorney, Agent, or Firm* — XSENSUS LLP

(57) ABSTRACT

A flag sequence generator (12) generates $\{x_0\}, \ldots, \{x_{\lambda-1}\}$ indicating a msb of a. A bit sequence generator (13) calculates $\{y_i\} := \{x_{2i}\}$ XOR $\{x_{2i+1}\}$ to generate $\{y_0\}, \ldots, \{y_{\lambda'-1}\}$. A flag calculator (14) calculates an exclusive logical sum of all $\{x_j\}$ to calculate [r] for each odd j. A public value multiplier setting-unit (16) sets r' that becomes $\sqrt{2}$ when $\lambda$ is an odd and 1 when $\lambda$ is an even. A normalization multiplier generator (17) bit-connects $\{y_0\}, \ldots$ to generate [c']. A normalization multiplier generator (18) bit-connects $\{x_{\lambda-1}\}, \ldots$ to generate [c]. A normalizer (19) calculates $[b] := [a][c]$. A square root calculator (20) calculates $[w] := [\sqrt{b}]*(r'/\sqrt{2})$ when r=1, and $[w'] := [\sqrt{b}]*r'$ when r=0. An inverse normalizer (21) calculates $[w][c']$ and performs $\lambda'$ bits right-shift.

7 Claims, 6 Drawing Sheets

SECURE SQUARE ROOT
COMPUTATION SYSTEM 100

(56) References Cited

OTHER PUBLICATIONS

Kamm Liina et al: "Secure floating point arithmetic and private satellite collision analysis", International Journal of Information Security (IJIS), Springer, vol. 14, No. 6, Dec. 18, 2014 (Dec. 18, 2014), pp. 531-548, XP035577326.

Manuel Liedel Ed-Mark D Ryan et al: "Secure Distributed Computation of the Square Root and Applications", Apr. 9, 2012 (Apr. 9, 2012), Information Security Practice and Experience, Springer Berlin Heidelberg, Berlin, Heidelberg, pp. 277-288, XP019175207.

Kikuchi Ryo et al: "Efficient Bit-Decomposition and Modulus-Conversion Protocols with an Honest Majority : 23rd Australasian Conference, ACISP 2018, Wollongong, NSW, Australia, Jul. 11-13, 2018, Proceedings" In: "Efficient Bit-Decomposition and Modulus-Conversion Protocols with an Honest Majority : 23rd Australasian Conference, ACISP 2018, Wollongong, NSW, Australia, Jul. 11-13, 2018, Proceedings", Jan. 1, 2018 (Jan. 1, 2018), Springer International Publishing, XP055932868, vol. 10946, pp. 64-82, DOI: 10.1007/978-3-319-93638-3_5.

Ikarashi, "Secure Real Number Operations for Secure AI-O(|p|)-Bit Communication and O(1)-Round Right Shift Protocol-", CSS2019, 2019, 16 pages including English Translation.

* cited by examiner

SECURE SQUARE ROOT
COMPUTATION SYSTEM 100

SECURE SQUARE ROOT COMPUTATION METHOD

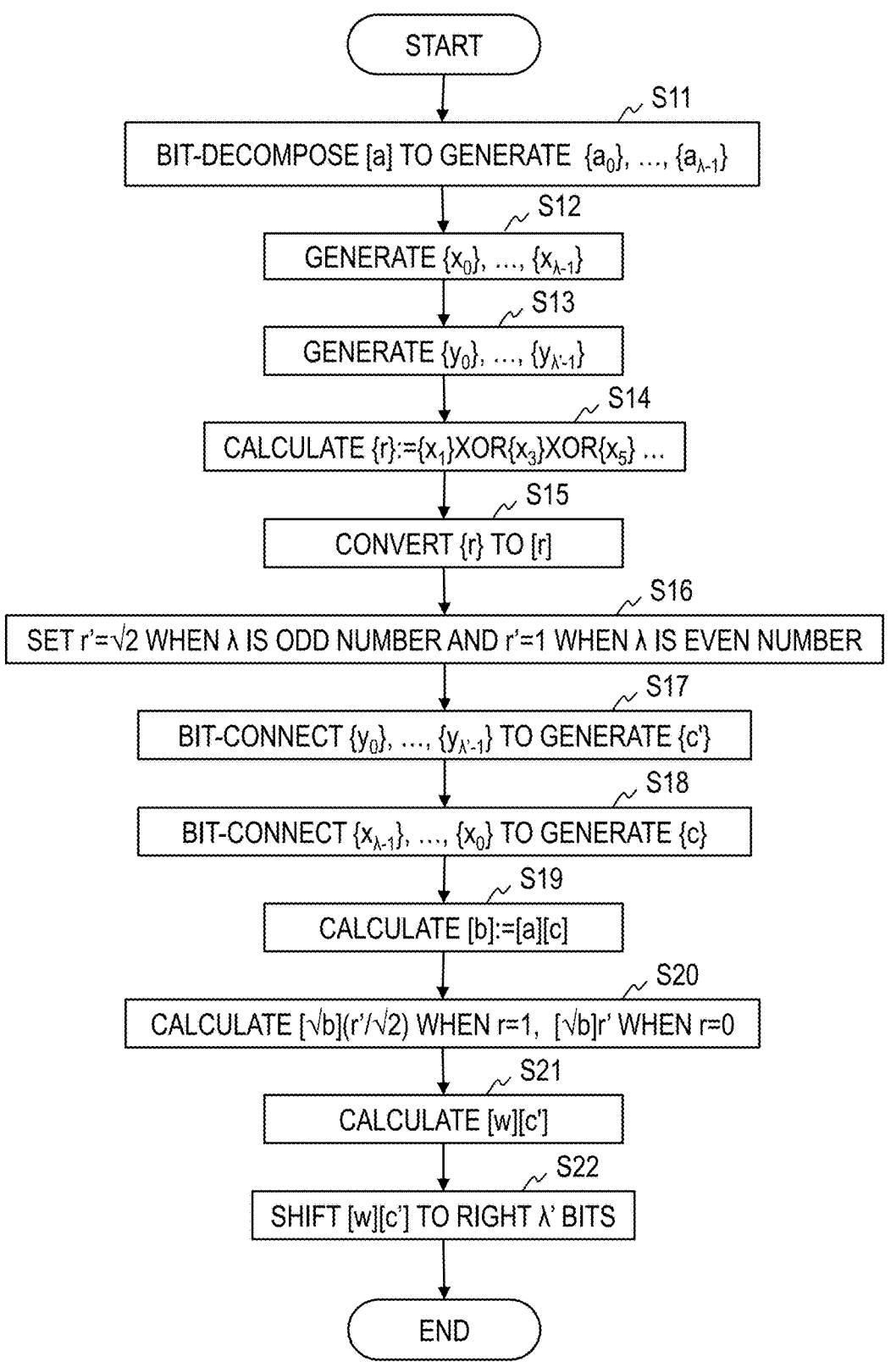

START

S11
BIT-DECOMPOSE [a] TO GENERATE $\{a_0\}, ..., \{a_{\lambda-1}\}$

S12
GENERATE $\{x_0\}, ..., \{x_{\lambda-1}\}$

S13
GENERATE $\{y_0\}, ..., \{y_{\lambda'-1}\}$

S14
CALCULATE $\{r\} := \{x_1\} XOR \{x_3\} XOR \{x_5\} ...$

S15
CONVERT $\{r\}$ TO $[r]$

S16
SET $r' = \sqrt{2}$ WHEN $\lambda$ IS ODD NUMBER AND $r' = 1$ WHEN $\lambda$ IS EVEN NUMBER S17
BIT-CONNECT $\{y_0\}, ..., \{y_{\lambda'-1}\}$ TO GENERATE $\{c'\}$ S18
BIT-CONNECT $\{x_{\lambda-1}\}, ..., \{x_0\}$ TO GENERATE $\{c\}$ S19
CALCULATE $[b] := [a][c]$ S20
CALCULATE $[\sqrt{b}](r'/\sqrt{2})$ WHEN $r=1$, $[\sqrt{b}]r'$ WHEN $r=0$ S21
CALCULATE $[w][c']$ S22
SHIFT $[w][c']$ TO RIGHT $\lambda'$ BITS

END

Fig. 4

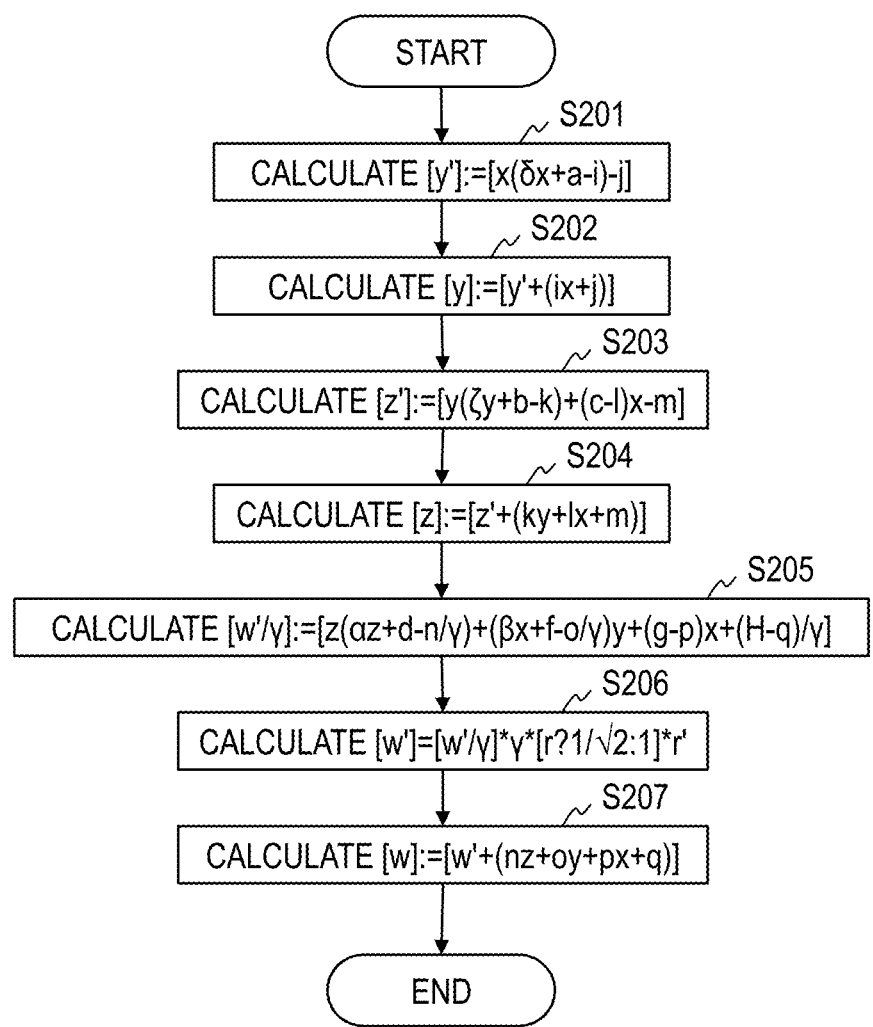

SQUARE ROOT CALCULATION USING EIGHTH
DEGREE POLYNOMINAL APPROXIMATION

START

S201

CALCULATE $[y'] := [x(\delta x + a - i) - j]$

S202

CALCULATE $[y] := [y' + (ix + j)]$

S203

CALCULATE $[z'] := [y(\zeta y + b - k) + (c - l)x - m]$

S204

CALCULATE $[z] := [z' + (ky + lx + m)]$

S205

CALCULATE $[w'/\gamma] := [z(\alpha z + d - n/\gamma) + (\beta x + f - o/\gamma)y + (g - p)x + (H - q)/\gamma]$

S206

CALCULATE $[w'] = [w'/\gamma]^*\gamma^*[r?1/\sqrt{2}:1]^*r'$

S207

CALCULATE $[w] := [w' + (nz + oy + px + q)]$

END

SECURE SQUARE ROOT COMPUTATION SYSTEM, SECURE NORMALIZATION SYSTEM, METHODS THEREFOR, SECURE COMPUTATION APPARATUS, AND PROGRAM

CROSS-REFERENCE TO RELATED APPLICATION

The present application is based on PCT filing PCT/JP2020/001674, filed Jan. 20, 2020, the entire contents of which are incorporated herein by reference.

TECHNICAL FIELD

The present invention relates to a technology for calculating a square root in secret computation.

BACKGROUND ART

Secure computation is a cryptographic technology for calculating any function while hiding data. A data utilization form is expected to be developed taking advantage of this feature so that data does not leak to either a system operator or a data user. There are several schemes for secure computation, and among them, the schemes including secret sharing as a component are known to have a small data processing unit and be able to perform high-speed processing.

Secret sharing is a method of converting secret information into several fragments called shares. For example, there is secret sharing called a (k, n) threshold method in which n shares are generated from the secret information and secrets can be restored from k or more shares, and thus, secret information is not leaked as long as the number of shares to restore the secret information is smaller than k. Shamir secret sharing, duplicate secret sharing, and the like are known as specific methods for configuring secret sharing. In the present specification, one fragment of a value shared by secret sharing is referred to as "share". Further, an entire set of all shares is called a "share value".

In recent years, research on advanced statistics or machine learning using secure computation has been actively performed. However, most of calculations thereof include calculations of an inverse, a square root, an exponent, a logarithm, and the like, going beyond calculations good for secure computation such as addition, subtraction, and multiplication. Calculation of a square root is one of basic calculations in a computer or the like, and is used in various situations. Generally, for calculation of a square root, calculation as $\sqrt{x}=x/\sqrt{x}$ via the inverse of the square root is known to be efficient. NPL 1 discloses a method of calculating a square root using the inverse of the square root in secure computation. Further, various function calculations including a square root may require processing for performing normalization so that a numerical value falls in a certain range. In the secure computation, normalization of a numerical value is performed by moving a most significant bit (msb).

CITATION LIST

Non Patent Literature

NPL 1: Dai Ikarashi, "Secure Real Number Operations for Secure AI -O(|p|)-Bit Communication and O(1)-Round Right Shift Protocol-", CSS2019, 2019

2

SUMMARY OF THE INVENTION

Technical Problem

However, the method disclosed in NPL 1 is computationally expensive because the inverse of a square root is obtained and then multiplication is performed.

An object of the present invention is to provide a secure computation technology capable of calculating a square root at high speed in view of the technical difficulty as described above.

Means for Solving the Problem

To solve the above problem, a secure square root computation system of a first aspect of the present invention is a secure square root computation system for receiving a share value [a] of a value a as an input, and calculating a share value [$\sqrt{a}$] of a square root of the value a. The secure square root computation system includes a plurality of secure computation apparatuses. $\lambda$ is a decimal point position of the value a, and $\lambda'$ is the smallest integer equal to or greater than $\lambda/2$. Each of the plurality of secure computation apparatuses includes a flag sequence generation unit configured to generate a first sequence of share values $\{x_0\}, \ldots, \{x_{\lambda-1}\}$ of a flag sequence $x_0, \ldots, x_{\lambda-1}$ indicating a most significant bit of the value a; a bit sequence generation unit configured to calculate an exclusive logical sum of share values $\{x_{2i}\}$ and share values $\{x_{2i+1}\}$ of the first sequence of share values to obtain share values $\{y_i\}$ of a bit $y_i$ to generate a second sequence of share values $\{y_0\}, \ldots, \{y_{\lambda'-1}\}$ of a bit sequence $y_0, \ldots, y_{\lambda'-1}$ where i is an integer equal to or greater than 0 and smaller than $\lambda'$; a flag calculation unit configured to calculate an exclusive logical sum of all share values $\{x_j\}$ of the first sequence of share values to obtain a share value $\{r\}$ of a division flag r where j is an odd number equal to or greater than 0 and smaller than $\lambda$; a public value multiplier setting unit configured to set a public value multiplier r', the public value multiplier r' being $\sqrt{2}$ when $\lambda$ is an odd number and 1 when $\lambda$ is an even number; an inverse normalization multiplier generation unit configured to generate a share value [c'] of an inverse normalization multiplier c' obtained by bit-connecting the second sequence of share values $\{y_0\}, \ldots, \{y_{\lambda'-1}\}$ in order from the front; a normalization multiplier generation unit configured to generate a share value [c] of a normalization multiplier c obtained by bit-connecting the first sequence of share values $\{x_0\}, \ldots, \{x_{\lambda-1}\}$ in reverse order; a normalization unit configured to calculate a share value [b] obtained by multiplying the share value [a] by the share value [c]; a square root calculation unit configured to use the share value [b], the share value $\{r\}$, and the public value multiplier r' and calculate $[\sqrt{b}]*(r'/\sqrt{2})$ when r=1 and $[\sqrt{b}]*r'$ when r=0 to obtain a share value [w]; and an inverse normalization unit configured to calculate the share value [$\sqrt{a}$] obtained by shifting right a multiplication result of the share value [w] and the share value [c'] by $\lambda'$ bits.

A secure normalization system of a second aspect of the present invention is a secret normalization system for normalizing a share value [a] of a value a to calculate the share value [$\sqrt{a}$] of a square root of the value a. The secret normalization system includes a plurality of secure computation apparatuses. $\lambda$ is a decimal point position of the value a, and $\lambda'$ is the smallest integer equal to or greater than $\lambda/2$. Each of the plurality of secure computation apparatus includes a flag sequence generation unit configured to generate a first sequence of share values $\{x_0\}, \ldots, \{x_{\lambda-1}\}$ of

3 a flag sequence $x_0, \ldots, x_{\lambda-1}$ indicating a most significant bit of the value a; a bit sequence generation unit configured to calculate an exclusive logical sum of share values $\{x_{2i}\}$ and share values $\{x_{2i+1}\}$ of the first sequence of share values to obtain share values $\{y_i\}$ of bits $y_i$ to generate a sequence of share values $\{y_0\}, \ldots, \{y_{\lambda'-1}\}$ of a bit sequence $y_0, \ldots, y_{\lambda'-1}$ where i is an integer i equal to or greater than 0 and smaller than $\lambda'$; a flag calculation unit configured to calculate an exclusive logical sum of all share values $\{x_j\}$ of the first sequence of share values to obtain a share value $\{r\}$ of a division flag r where j is an odd number equal to or greater than 0 and smaller than $\lambda$; a public value multiplier setting unit configured to set a public value multiplier r', the public value multiplier r' being $\sqrt{2}$ when $\lambda$ is an odd number and 1 when $\lambda$ is an even number; an inverse normalization multiplier generation unit configured to generate a share value [c'] of an inverse normalization multiplier c' obtained by bit-connecting the second sequence of share values $\{y_0\}, \ldots, \{y_{\lambda'-1}\}$ in order from the front; a normalization multiplier generation unit configured to generate a share value [c] of a normalization multiplier c obtained by bit-connecting the first sequence of share values $\{x_0\}, \ldots, \{x_{\lambda-1}\}$ in reverse order; and a normalization unit configured to calculate a share value [b] obtained by multiplying the share value [a] by the share value [c].

Effects of the Invention

According to the present invention, it is possible to calculate the square root at high speed in secure computation.

BRIEF DESCRIPTION OF DRAWINGS

FIG. 4 is a diagram illustrating a processing procedure of a secure square root computation method.

FIG. 5 is a diagram illustrating a processing procedure of the square root calculation unit.

DESCRIPTION OF EMBODIMENTS

Figure 1:
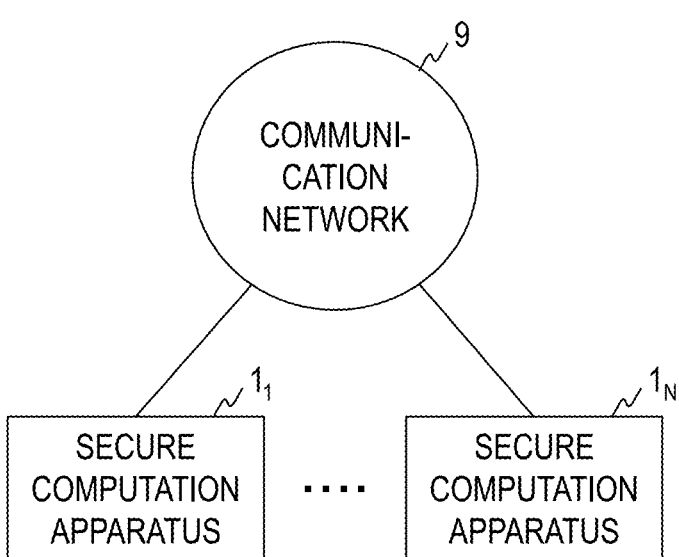
FIG. 1 is a diagram illustrating a functional configuration of a secure square root computation system.

Hereinafter, embodiments of the present invention will be described in detail. In the drawings, components having the same function are denoted by the same numbers, and duplicate description thereof will be omitted.

In the present specification, the following notation is used.

[·] is data in which a numerical value • is hidden. For example, share values of Shamir secret sharing, duplicate secret sharing, or the like can be used.

{·} is data in which a bit • is hidden. For example, a share value of replication secret sharing on $Z_2$, or the like can be used.

$\lambda$ denotes a decimal point position. About a half of the number |p| of bits of a ring or a field used for secure computation is assumed.

[a?b:c] represents b when a=1 and c when a=0.

$$\neg, \wedge, \vee, \oplus \qquad \text{[Math. 1]}$$

4

Symbols described above indicate a logical negation (NOT), a logical product (AND), a logical sum (OR), and an exclusive OR (XOR), respectively.

An integer in a ring can be regarded as a fixed-point real number by setting a public decimal point position for the integer. In the present invention, the fixed-point real number represented in the ring in this way is simply referred to as a real number.

Embodiment: Secure Square Root Computation System

An embodiment of the present invention is a secure square root computation system and method in which a share value [a] of a value a is an input and a share value [$\sqrt{a}$] of a square root of the value a is calculated with the value a hidden. Hereinafter, an overview of a square root protocol executed by the secure square root calculation system of the embodiment will be described.

In the related art, in secure computation, a group of elementary functions such as an inverse, a square root, an exponential function, and a logarithm function that go beyond addition, subtraction, and multiplication has a high processing cost and has not been implemented. In order to solve these problems, the present invention enables a square root to be efficiently calculated using an algorithm that can efficiently and uniformly approximate a group of elementary functions in the secure computation. With this approximation scheme, it is possible to approximate major elementary functions including a square root simply by changing parameters with a single scheme. Further, this approximation scheme is an amount of communication/the number of rounds for three real number multiplications in single precision (23 bits), which is a theoretically optimized efficiency.

In square root calculation for plaintext, the following normalization may be performed for efficient calculation. A difference between a position of a digit of 1 (that is, $2^0$) at a decimal point position of an input a and a most significant bit (msb) of the input a is set to e and the following modification is performed. That is, multiplication by $2^e$ is performed for normalization to a section [1, 2), a square root $\sqrt{(2^e a)}$ is obtained, and then multiplication by $1/\sqrt{2^e}$ is performed.

$$\sqrt{a} = \frac{1}{\sqrt{2^e}}\sqrt{2^e a} \qquad \text{[Math. 2]}$$

In NPL 1, a method using a relationship $1/\sqrt{a} \times a = \sqrt{a}$ was used. In the present invention, $\sqrt{a}$ is obtained directly for more efficient calculation. In this case, inverse calculation of normalization after approximation is division. Thus, this is processing for performing multiplication by $\sqrt{2^{\lambda-e}}$ and division by $\sqrt{2^\lambda}$ for division by $\sqrt{2^e}$.

An algorithm for approximating a group of elementary functions in the secure computation with an eighth degree polynomial is shown hereinafter.

Algorithm 1: Function Approximation Protocol using Eighth Degree Polynomial
Input: [x]∈[L, R)
Parameters: a, b, c, d, f, g, H, i, j, k, l, m, n, o, p, q, α, β, γ, δ, and ζ
Output: [func (x)] corresponding to a target function func
1: Calculate [y']:=[x(ζx+a−i)−j]] using a sum of products, and lower a decimal point position by right shift.
2: Calculate [y]:=[y'+(ix+j)].

5

3: Calculate $[z']:=[y(\zeta y+b-k)+(c-1)x-m]$ by sum of products, and lower the decimal point position by right shift.

4: Calculate $[z]:=[z'+(ky+1x+m)]$.

5: Calculate $[w'/\gamma]:=[z(\alpha z+d-n/\gamma)+(\beta x+f-o/\gamma)\ y+(g-p)x+(H-q)/\gamma]$ by sum of products, and perform multiplication by $\gamma$ and lowering a decimal point position at the same time to obtain $[w']$.

6: Output $[w]:=[w'+(nz+oy+px+q)]$.

The lowering of the decimal point position executed in steps 1 and 3 of algorithm 1 can be efficiently performed by using, for example, a public divisor division disclosed in NPL 1.

Simultaneous execution of the public value multiplication and lowering of the decimal point executed in step 5 of algorithm 1 can be efficiently performed by using, for example, the following algorithm.

Algorithm 2: Multiplication of Public Value at Same Time without Increasing Processing Cost from Right Shift Input: [x], multiplier m, shift amount $\sigma$ Output: [mx] after shift 1: Calculate a public value $2^\sigma/m$.

2: Calculate the following equation through public value division. Here, [mx] is regarded as an expression the decimal point position of which is $\sigma$ lower than that of [x].

$$\frac{[x]}{\dfrac{2^\sigma}{m}} = [mx] \qquad \text{[Math. 3]}$$

Parameters L, R, a, b, c, d, f, g, H, i, j, k, l, m, n, o, p, q, u, $\alpha$, $\beta$, $\gamma$, $\delta$, and $\zeta$ used in algorithm 1 are set according to the approximate function func. When a square root function, which is a target in the present invention, is approximated, the respective parameters are set as shown in the following table, for example. Note that $e_x$, $e_y$, $e_z$, and $e_w$ are decimal point positions of x, y, z, and w, and $e'_y$, $e'_z$, and $e'_w$ are decimal point positions of y', z', and w'. These are parameters that determine an amount of right shift in eighth degree polynomial approximation. For example, the amount of right shift when y is calculated from y' is $e'_y - e_y$.

TABLE 1

| L | 1 | $\alpha$ | −14.25 |
|---|---|---|---|
| R | 2 | $\beta$ | 0.125 |
| a | −0.428141400291061 | $\gamma^{-1}$ | 1.07420733657823 |
| b | 0.410120079876874 | $\delta$ | $2^{-3}$ |
| c | −0.0120309584327484 | $\zeta$ | $2^{-1}$ |
| d | −3.71795672639017 | $e_x$ | 28 |
| f | −0.64377993662956 | $e_y$ | 29 |
| g | 0.44709763892185 | $e_z$ | 29 |
| H | 0.232903741490693 | $e_w$ | 28 |
| i | 0 | $e'_y$ | 62 |
| j | −0.366610117286381 | $e'_z$ | 64 |
| k | 0 | $e'_w$ | 60 |
| l | 0 | | |
| m | −0.106711930503672 | | |
| n | 0 | | |
| o | 0 | | |
| p | 0 | | |
| q | 0.765 | | |

An algorithm for calculating a square root in the secure computation using algorithm 1 is shown hereafter. An algorithm for normalizing an input, which is a calculation target, for calculation of a square root (algorithm 3) and an algorithm for calculating the square root using algorithm 3 (algorithm 4) will be separately described herein.

Algorithm 3: Normalization Protocol for Square Root

Input: [a]

Output: [b], [r], [c'] (where b is a value obtained by moving a most significant bit of a to a decimal point position $\lambda$ (that is, a value obtained by normalizing a to [1, 2); r is a truth value indicating whether a calculation result is divided by $\sqrt{2}$; c' is a number of a power of 2 that is used for an inverse calculation of normalization.)

1: Obtain a bit representation $\{a_0\}, \ldots, \{a_{\lambda-1}\}$ of [a] through bit decomposition.

2: Obtain a bit sequence $\{x_0\}, \ldots, \{x_{\lambda-1}\}$ in which only the value at a position of the most significant bit of a is 1.

3: Set $\lambda'$ using the following equation. That is, let $\lambda'$ be a smallest integer equal to or greater than $\lambda/2$ $$\lambda' := \left\lceil \frac{\lambda}{2} \right\rceil \qquad \text{[Math. 4]}$$

4: Set $\{y_i\}$ using the following equation where $i<\lambda'$. That is, an exclusive logical sum of $\{x_{2i}\}$ and $\{x_{2i+1}\}$ is calculated.

$$\{y_i\} := \{x_{2i}\} \oplus \{x_{2i+1}\} \qquad \text{[Math. 5]}$$

However, when $\lambda$ is an odd number, $\{y_{\lambda'-1}\}$ is set according to the following equation:

$$\{y_{\lambda'-x}\} := \{x_{2i}\} \qquad \text{[Math. 6]}$$

5: Set $\{r\}$ using the following equation. That is, an exclusive logical sum of all $\{x_j\}$ is calculated where j is an odd number equal to or greater than 0 and smaller than $\lambda$. r indicates whether it is necessary to perform division by $\sqrt{2}$.

$$\{r\} := \{x_1\} \oplus \{x_3\} \oplus \{x_5\} \oplus \qquad \text{[Math. 7]}$$

6: Change $\{r\}$ to [r] through mod p conversion.

7: Connect $\{y_0\}, \ldots, \{y_{\lambda'-1}\}$ through bit connection to obtain [c'].

8: Connect $\{x_{\lambda-1}\}, \ldots, \{x_0\}$ through bit connection to obtain [c].

9: Calculate $[b]:=[a][c]$ and output [b], [r], and [c'].

Algorithm 4: Square Root Protocol

Input: [a]

Output: $[\sqrt{a}]$

1: Obtain the value [b] obtained by normalizing [a] to [1, 2), and [c'] and [r'] required for inverse calculation of normalization using algorithm 3.

2: Set $\lambda'$ using the following equation. That is, set a smallest integer equal to or greater than $\lambda/2$ as $\lambda'$.

$$\lambda' := \left\lceil \frac{\lambda}{2} \right\rceil \qquad \text{[Math. 8]}$$

3: When $\lambda$ is an odd number, r' is set to $\sqrt{2}$, and when $\lambda$ is an even number, r' is set to 1.

4: Execute algorithm 1 for [b] and calculate a square root of [b]. In this case, for multiplication of a public value $\gamma$ performed in step 5 of algorithm 1, selective public multiplication is executed with a condition being [r] and options being r'$\gamma$ and $(r'/\sqrt{2})\gamma$, and $[w'/\gamma]*\gamma*[r?\sqrt{2}:1]*r'$ is calculated. A result is [w].

5: Calculate [w][c']. In this case, right shift is performed with extra of $\lambda'$ bits unlike usual.

Generation of a flag sequence indicating the most significant bit executed in step 2 of algorithm 3 can be efficiently performed by using, for example, the following algorithm.

Algorithm 5: MSB Flag Sequence Acquisition Protocol

Input: Bit-represented integer $\{a_0\}, \ldots, \{a_{\lambda-1}\}$

Output: Bit sequence $\{x_0\}, \ldots, \{x_{\lambda-1}\}$ in which only the value at the position of the msb of a is 1.

1: Under $0 \leq i < \lambda-1$, assume $\{f_i\} := \{f_{i+1} \lor a_i\}$.

2: Assume $\{f_{\lambda-1}\} := \{a_{\lambda-1}\}$. Here, $\{f_0\}, \ldots, \{f_{\lambda-1}\}$ is a bit sequence in which 0s and 1s are lined up with msb as a boundary, such as 0, 0, 0, 1, 1, 1, . . . , 1.

3: Under $0 \leq i < \lambda-1$, assume $\{x_i\} := \{f_i \text{ XOR } f_{i+1}\}$.

4: Assume $\{x_{\lambda-1}\} := \{a_{\lambda-1}\}$. Here, $\{x_0\}, \ldots, \{x_{\lambda-1}\}$ is a bit sequence in which only the value at the position of msb is 1, such as 0, 0, 0, 1, 0, 0, . . . , 0.

The selective public multiplication executed in step 4 of algorithm 4 can be efficiently executed by using, for example, the following algorithm.

Algorithm 6: Multiplication of Required Right Shift Value by Selective Public Multiplier Input: [a], multipliers $m_0$ and $m_1$, condition [c]

Output: $[m_1 a]$ if c=1 and $[m_0 a]$ if c=0

1: Calculate $[m_1 a]$ and $[m_0 a]$.

2: Output $[c?m_1a:m_0a]$ using an if-then-else gate.

The public value multiplication executed in step 1 of algorithm 6 can be efficiently performed, for example, by combining algorithm 2 with the following algorithm.

Algorithm 7: Right Shift in Plurality of Divisors/Public Divisor Division

Input: [a], divisor $d_0, d_1, \ldots, d_{n-1}$

Output: $[a/d_0], [a/d_1], \ldots, [a/d_{n-1}]$

1: Obtain a quotient [q] of [a].

2: Use the quotient [q] to calculate and output $[a/d_i]$ for each i by right shift/public divisor division.

The quotient obtained in step 1 of algorithm 7 can be efficiently obtained through quotient transfer (see Reference 1).

Reference 1: Ryo Kikuchi, Dai Ikarashi, Takahiro Matsuda, Koki Hamada, and Koji Chida, "Efficient bit-decomposition and modulus-conversion protocols with an honest majority", Proceedings of Information Security and Privacy-23rd Australasian Conference (ACISP 2018), pp. 64-82, Jul. 11-13, 2018.

Secure Square Root Computation System 100

The secure square root calculation system 100 of the embodiment is an information processing system that executes the above square root protocol. The secure square root computation system 100 includes N (≥3) secure computation apparatuses $1_1, \ldots, 1_N$, as illustrated in FIG. 1. In this embodiment, the secure computation apparatuses $1_1, \ldots, 1_N$ are connected to a communication network 9. The communication network 9 is a circuit-switched or packet-switched communication network configured so that respective connected apparatuses can communicate with each other and, for example, the Internet, a local area network (LAN), a wide area network (WAN), or the like can be used. It is not necessary for each apparatus to be able to communicate online via the communication network 9. For example, information to be input to a secure computation apparatus $1_n$ (n=1, . . . , N) may be stored in a portable recording medium such as a magnetic tape or a USB memory and input offline from the portable recording medium to the secure computation apparatus $1_n$.

Figure 2:
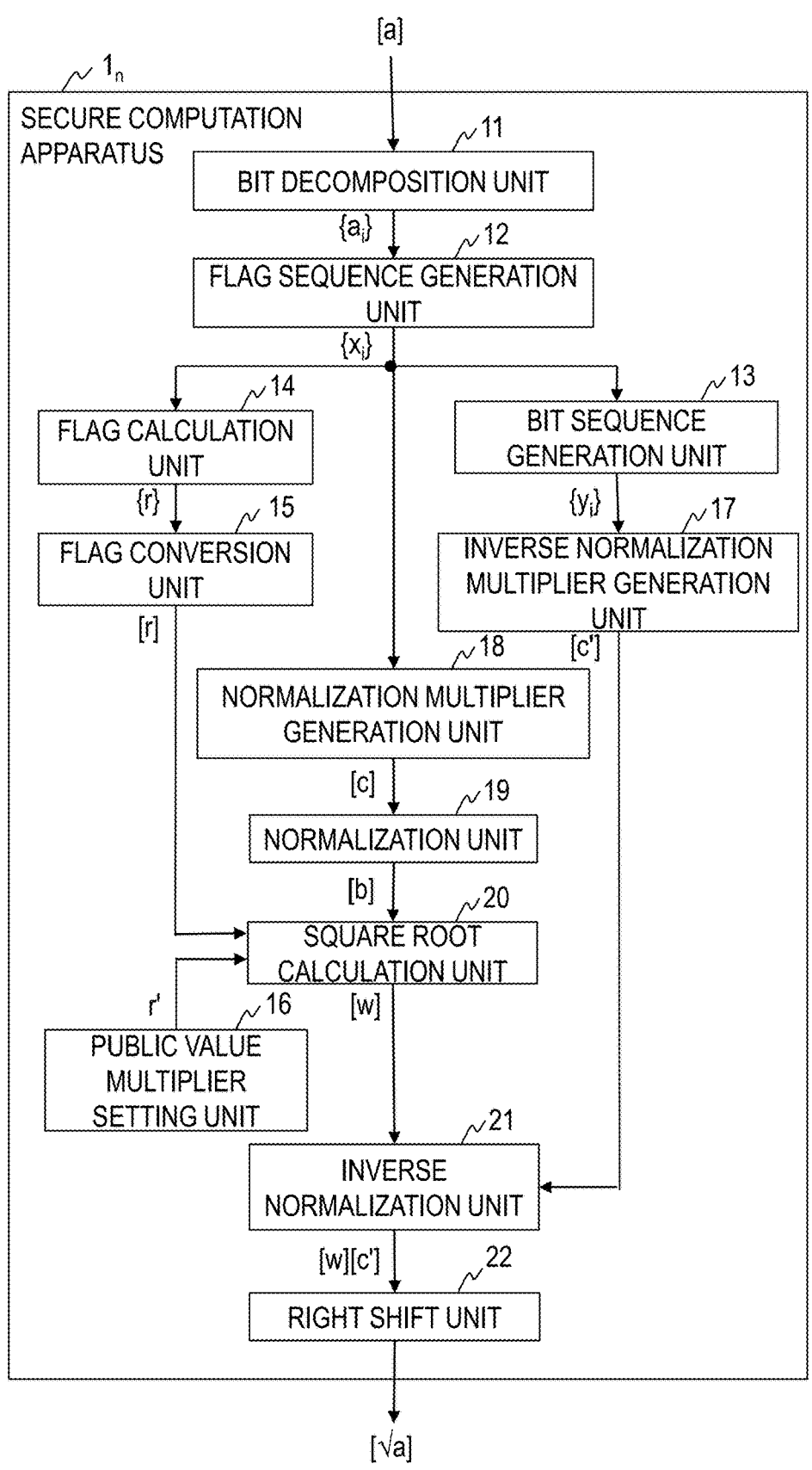
FIG. 2 is a diagram illustrating a functional configuration of a secure computation apparatus.
Figure 3:
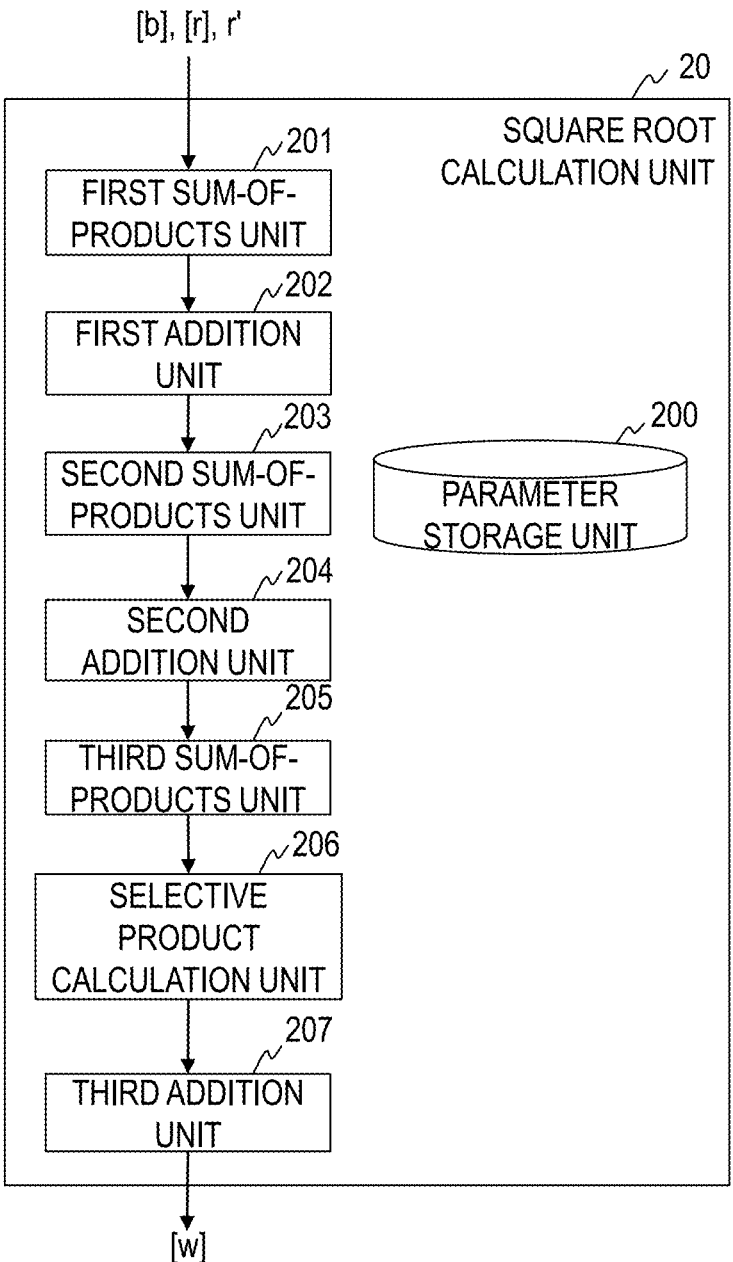
FIG. 3 is a diagram illustrating a functional configuration of a square root calculation unit.

The secure computation apparatus $1_n$ included in the secure square root calculation system 100 of the embodiment includes, for example, a bit decomposition unit 11, a flag sequence generation unit 12, a bit sequence generation unit 13, a flag calculation unit 14, a flag conversion unit 15, a public value multiplier setting unit 16, an inverse normalization multiplier generation unit 17, a normalization multiplier generation unit 18, a normalization unit 19, a square root calculation unit 20, an inverse normalization unit 21, and a right shift unit 22, as shown in FIG. 2. The square root calculation unit 20 includes, for example, a parameter storage unit 200, a first sum-of-products unit 201, a first addition unit 202, a second sum-of-products unit 203, a second addition unit 204, and a third sum-of-products unit 205, a selective product calculation unit 206, and a third addition unit 207, as illustrated in FIG. 3. A secure square root computation method of the embodiment is realized by the secure computation apparatus $1_n$ performing processing of each step to be described below in cooperation with another secure computation apparatus $1_{n'}$ (n'=1, . . . , N, where n≠n').

The secure computation apparatus $1_n$ is a special apparatus configured by loading a special program into a publicly known or dedicated computer including, for example, a central processing unit (CPU), a main storage device (RAM: Random Access Memory), and the like. The secure computation apparatus $1_n$ executes each process under the control of the central processing unit, for example. Data input to the secure computation apparatus $1_n$ or data obtained by each processing is stored in, for example, the main storage device, and the data stored in the main storage device is read to the central processing unit as needed, and used for other processing. At least a part of each processing unit of the secure computation apparatus $1_n$ may be configured by hardware such as an integrated circuit. Each storage unit included in the secure computation apparatus $1_n$ can be configured of, for example, a main storage device such as a random access memory (RAM), an auxiliary storage device configured of a hard disk, an optical disc, or a semiconductor memory element such as a flash memory, or middleware such as a relational database or a key value store.

A processing procedure of the secure square root computation method executed by the secure square root computation system 100 of the embodiment will be described with reference to FIG. 4.

In step S11, the bit decomposition unit 11 of each secure computation apparatus $1_n$ bit-decomposes the share value [a] of the value a input to the secure square root computation system 100 to obtain a sequence of the share values $\{a_0\}, \ldots, \{a_{\lambda-1}\}$ of the bit representation $a_0, \ldots, a_{\lambda-1}$ of the value a. The bit decomposition unit 11 outputs a sequence of share values $\{a_0\}, \ldots, \{a_{\lambda-1}\}$ to the flag sequence generation unit 12.

In step S12, the flag sequence generation unit 12 of each secure computation apparatus $1_n$ uses the sequence of share values $\{a_0\}, \ldots, \{a_{\lambda-1}\}$ to generate a sequence of share values $\{x_0\}, \ldots, \{x_{\lambda-1}\}$ of a flag sequence $x_0, \ldots, x_{\lambda-1}$ indicating a most significant bit of a value a. The flag sequence indicating the most significant bit is, for example, a flag sequence in which only the value at the position of the most significant bit obtained by using the above algorithm 5 is 1. The flag sequence generation unit 12 outputs the sequence of share values $\{x_0\}, \ldots, \{x_{\lambda-1}\}$ to the bit sequence generation unit 13, the flag calculation unit 14, and the normalization multiplier generation unit 18.

In step S13, the bit sequence generation unit 13 of each secure computation apparatus $1_n$ uses the sequence of share values $\{x_0\}, \ldots, \{x_{\lambda-1}\}$ to generate a sequence of share values $\{y_0\}, \ldots, \{y_{\lambda'-1}\}$ of a bit sequence $y_0, \ldots, y_{\lambda'-1}$ that becomes $\{y_i\} := \{x_{2i}\} \text{ XOR } \{x_{2i+1}\}$ where i<λ'. Here, λ' is the smallest integer equal to or greater than λ/2. That is, share values $\{y_i\}$ of the bit $y_i$ obtained by calculating an exclusive logical sum of the share values $\{x_{2i}\}$ and the share values $\{x_{2i+1}\}$ are obtained where i is an integer equal to or greater than 0 and smaller than $\lambda'$. Further, when $\lambda$ is an odd number, $\{y_{\lambda'-1}\}:=\{x_{2i}\}$ is assumed. The bit sequence generation unit 13 outputs the sequence of share values $\{y_0\}, \ldots, \{y_{\lambda'-1}\}$ to the inverse normalization multiplier generation unit 17.

In step S14, the flag calculation unit 14 of each secure computation apparatus in uses the sequence of share values $\{x_0\}, \ldots, \{x_{\lambda-1}\}$ to calculate a share value $\{r\}$ of the flag r (hereinafter also referred to as a "division flag") indicating whether a calculation result is divided by $\sqrt{2}$. Specifically, an exclusive logical sum of all share values $\{x_j\}$ is calculated where j is an odd number equal to or greater than 0 and smaller than $\lambda$. The flag calculation unit 14 outputs the share value $\{r\}$ to the flag conversion unit 15.

In step S15, the flag conversion unit 15 of each secure computation apparatus $1_n$ converts the share value $\{r\}$ of the division flag r into the share value $[r]$ through mod p conversion.
The flag conversion unit 15 outputs the share value $[r]$ to the square root calculation unit 20.

In step S16, the public value multiplier setting unit 16 of each secure computation apparatus $1_n$ sets $r'=\sqrt{2}$ when $\lambda$ is an odd number and $r'=1$ when $\lambda$ is an even number, and sets a public value $r'$ by which a calculation result is multiplied (hereinafter also referred to as a "public value multiplier"). The public value multiplier setting unit 16 outputs the public value multiplier $r'$ to the square root calculation unit 20.

In step S17, the normalization multiplier generation unit 17 of each secure computation apparatus $1_n$ bit-connects the sequence of share values $\{y_0\}, \ldots, \{y_{\lambda'-1}\}$ in order from the front to generate a share value $[c']$ of the multiplier $c'$ by which a calculation result is multiplied in order to perform an inverse calculation of normalization (hereinafter also referred to as a "inverse normalization multiplier"). The inverse normalization multiplier generation unit 17 outputs the share value $[c']$ to the inverse normalization unit 21.

In step S18, the normalization multiplier generation unit 18 of each secure computation apparatus $1_n$ bit-connects the sequence of share values $\{x_0\}, \ldots, \{x_{\lambda-1}\}$ in reverse order to generate a share value $[c]$ of a multiplier c by which an input is multiplied for normalization (hereinafter also referred to as a "normalization multiplier"). The normalization multiplier generation unit 18 outputs the share value $[c]$ to the normalization unit 19.

In step S19, the normalization unit 19 of each secure computation apparatus $1_n$ multiplies the share value $[a]$ of the value a by the share value $[c]$ of the normalization multiplier c to calculate a share value $[b]$ of a value b obtained by normalizing the value a. The normalization unit 19 outputs the share value $[b]$ to the square root calculation unit 20.

In step S20, the square root calculation unit 20 of each secure computation apparatus $1_n$ uses parameters for approximating a square root function with an eighth degree polynomial to execute algorithm 1, so that the square root is calculated for the share value $[b]$ of the value b. In this case, multiplication of the public value $\gamma$ performed in step of algorithm 1 is performed by executing algorithm 6 with a condition being the share value $[r]$ of the division flag r and options being $r'\gamma$ and $(r'/\sqrt{2})\gamma$. That is, the square root calculation unit 20 uses the share value $[b]$ of the value b and the share value $[r]$ of the division flag r to calculate $[\sqrt{b}]*(r'/\sqrt{2})$ when $r=1$ and $[\sqrt{b}]*r'$ when $r=0$ to generate a share value $[w]$ of a calculation result w. The square root calculation unit 20 outputs the share value $[w]$ to the inverse normalization unit 21.

In step S21, the inverse normalization unit 21 of each secure computation apparatus $1_n$ multiplies the share value $[w]$ of the calculation result w by the share value $[c']$ of the inverse normalization multiplier c'. The inverse normalization unit 21 outputs the multiplication result $[w][c']$ to the right shift unit 22.

In step S22, the right shift unit 22 of each secure computation apparatus $1_n$ shifts right the multiplication result $[w][c']$ by $\lambda'$ bits and outputs a share value $[\sqrt{a}]$ of the square root of the value a.

A processing procedure that is executed by the square root calculation unit 20 will be described in detail with reference to FIG. 5.

Parameters a, b, c, d, f, g, H, i, j, k, l, m, n, o, p, q, $\alpha$, $\beta$, $\gamma$, $\delta$, and $\zeta$ for approximating the square root function with an eighth degree polynomial are stored in the parameter storage unit 200. Each parameter is determined in advance according to a function to be approximated, and when the square root function is approximated, values shown in Table 1 are set.

In step S201, the first sum-of-products unit 201 of the square root calculation unit 20 calculates $[y']:=[x(\delta x+a-i)-j]$ through a sum of products, and lowers a decimal point position through right shift. Here, x is a value b obtained by normalizing the value a. That is, $[x]:=[b]$. The first sum-of-products unit 201 outputs $[y']$ to the first addition unit 202.

In step S202, the first addition unit 202 of the square root calculation unit 20 calculates $[y]:=[y'+(ix+j)]$. The first addition unit 202 outputs $[y]$ to the second sum-of-products unit 203.

In step S203, the second sum-of-products unit 203 of the square root calculation unit 20 calculates $[z']:=[y(\zeta y+b-k)+(c-1)x-m]$ through a sum of products, and lowers a decimal point position through right shift. The second sum-of-products unit 203 outputs $[z']$ to the second addition unit 204.

In step S204, the second addition unit 204 of the square root calculation unit 20 calculates $[z]:=[z'+(ky+lx+m)]$. The second addition unit 204 outputs $[z]$ to the third sum-of-products unit 205.

In step S205, the third sum-of-products unit 205 of the square root calculation unit 20 calculates $[w'/\gamma]:=[z(\alpha z+d-n/\gamma)+(\beta x+f-o/\gamma)y+(g-p)x+(H-q)/\gamma]$ through a sum of products. The third sum-of-products unit 205 outputs $[w'/\gamma]$ to the selective product calculation unit 206.

In step S206, the selective product calculation unit 206 of the square root calculation unit 20 executes algorithm 6 with a condition being $[r]$ and options being $r'\gamma$ and $(r'/\sqrt{2})\gamma$. That is, using the share value $[r]$ of the division flag r, $[w']:=[w'/\gamma]*(r'/\sqrt{2})\gamma$ is calculated when $r=1$, and $[w']:=[w'/\gamma]*r'\gamma$ is calculated when $r=0$. The selective product calculation unit 206 outputs $[w']$ to the third addition unit 207.

In step S207, the third addition unit 207 of the square root calculation unit 20 calculates $[w]:=[w'+(nz+oy+px+q)]$.
Modification Example: Secure Normalization System
The secure square root computation system 100 of the embodiment is configured to execute both normalization for square root calculation (algorithm 3) and square root calculation (algorithm 4). A secret normalization system of the modification example is configured to execute only a part of the secure square root computation system 100 that performs normalization (algorithm 3) for the square root calculation. That is, the secret normalization system receives a share value $[a]$ of a value a, and outputs a share value $[b]$ of a value b obtained by normalizing the value a to $[1, 2)$, a share value $[c']$ of an inverse normalization multiplier c', and a share value $[r]$ of a division flag r. Specifically, the secure computation apparatus $1_n$ included in the secret normalization system of the modification example includes a bit decomposition unit 11, a flag sequence generation unit 12, a bit sequence generation unit 13, a flag calculation unit 14, a flag conversion unit 15, an inverse normalization multiplier generation unit 17, a normalization multiplier generation unit 18, and a normalization unit 19.

Although the embodiments of the present invention have been described above, a specific configuration is not limited to these embodiments, and even when a design is appropriately changed without departing from the spirit of the present invention, it is obvious that this is included in the present invention. Various processing described in the embodiments may be not only executed in chronological order according to order of description, but may also be executed in parallel or individually according to a processing capacity of an apparatus that executes processing or as necessary.

Program and Recording Medium

Figure 6:
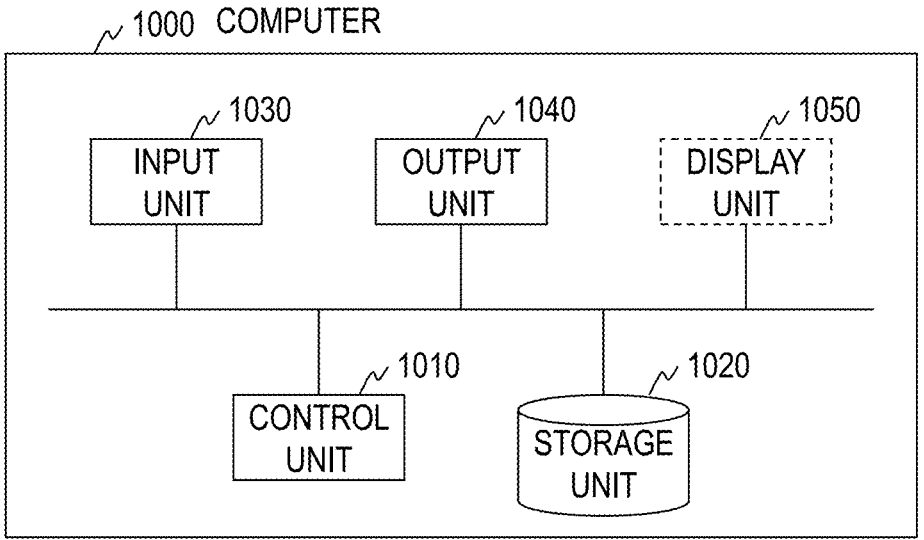
FIG. 6 is a diagram illustrating a functional configuration of a computer.

When various processing functions in each apparatus described in the above embodiment are realized by a computer, processing content of the function to be included in each apparatus is described by a program. This program is loaded into a storage unit 1020 of a computer illustrated in FIG. 6 and a control unit 1010, an input unit 1030, an output unit 1040, and the like are operated according to the program so that various processing functions in each of the above apparatuses are realized on the computer.

A program in which processing content thereof has been described can be recorded on a computer-readable recording medium. The computer-readable recording medium may be, for example, a magnetic recording device, an optical disc, a magneto-optical recording medium, or a semiconductor memory.

Further, distribution of this program is performed, for example, by selling, transferring, or renting a portable recording medium such as a DVD or CD-ROM on which the program has been recorded. Further, the program may be distributed by being stored in a storage device of a server computer and transferred from the server computer to another computer via a network.

The computer that executes such a program first temporarily stores, for example, the program recorded on the portable recording medium or the program transferred from the server computer in a storage device of the computer. When the computer executes the processing, the computer reads the program stored in the recording medium of the computer and executes processing according to the read program. Further, as another embodiment of the program, the computer may directly read the program from the portable recording medium and execute the processing according to the program, and further, processing according to a received program may be sequentially executed each time the program is transferred from the server computer to the computer. Further, a configuration may be adopted in which the above-described processing is executed by a so-called application service provider (ASP) type service for realizing a processing function according to only an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

Further, in this embodiment, although the present apparatus is configured by a predetermined program being executed on the computer, at least a part of processing content of thereof may be realized by hardware.

The invention claimed is:

1. A secure square root computation system for receiving a share value [a] of a value a as an input, and calculating a share value $[\sqrt{a}]$ of a square root of the value a, the secure square root computation system comprising:

a plurality of secure computation apparatuses, wherein $\lambda$ is a decimal point position of the value a, and $\lambda'$ is the smallest integer equal to or greater than $\lambda/2$, and each of the plurality of secure computation apparatuses comprises:

processing circuitry configured to:

generate, in cooperation with others of the secure computation apparatuses via communications including transmitting and receiving data over a network, a first sequence of share values $\{x_0\}, \ldots, \{x_{\lambda-1}\}$ of a flag sequence $x_0, \ldots, x_{\lambda-1}$ indicating a most significant bit of the value a;

calculate, in cooperation with others of the secure computation apparatuses via communications including transmitting and receiving data over the network, an exclusive logical sum of share values $\{x_{2i}\}$ and share values $\{x_{2i+1}\}$ of the first sequence of share values to obtain share values $\{y_i\}$ of a bit $y_i$ to generate a second sequence of share values $\{y_0\}, \ldots, \{y_{\lambda'-1}\}$ of a bit sequence $y_0, \ldots, y_{\lambda'-1}$ where i is an integer equal to or greater than 0 and smaller than $\lambda'$;

calculate, in cooperation with others of the secure computation apparatuses via communications including transmitting and receiving data over the network, an exclusive logical sum of all share values $\{x_j\}$ of the first sequence of share values to obtain a share value $\{r\}$ of a division flag r where j is an odd number equal to or greater than 0 and smaller than $\lambda$;

set, in cooperation with others of the secure computation apparatuses via communications including transmitting and receiving data over the network, a public value multiplier r', the public value multiplier r' being $\sqrt{2}$ when $\lambda$ is an odd number and 1 when $\lambda$ is an even number;

generate, in cooperation with others of the secure computation apparatuses via communications including transmitting and receiving data over the network, a share value [c'] of an inverse normalization multiplier c' obtained by bit-connecting the second sequence of share values $\{y_0\}, \ldots, \{y_{\lambda'-1}\}$ in order from the front;

generate, in cooperation with others of the secure computation apparatuses via communications including transmitting and receiving data over the network, a share value [c] of a normalization multiplier c obtained by bit-connecting the first sequence of share values $\{x_0\}, \ldots, \{x_{\lambda-1}\}$ in reverse order;

calculate a share value [b] obtained by multiplying the share value [a] by the share value [c];

use the share value [b], the share value $\{r\}$, and the public value multiplier r' and calculate $[\sqrt{b}]*(r'/\sqrt{2})$ when r=1 and $[\sqrt{b}]*r'$ when r=0 to obtain, in cooperation with others of the secure computation apparatuses via communications including transmitting and receiving data over the network, a share value [w]; and calculate, in cooperation with others of the secure computation apparatuses via communications including transmitting and receiving data over the

13 network, the share value $[\sqrt{a}]$ obtained by shifting right a multiplication result of the share value $[w]$ and the share value $[c']$ by $\lambda'$ bits.

2. The secure square root computation system according to claim 1, wherein a, b, c, d, f, g, H, i, j, k, l, m, n, o, p, q, $\alpha$, $\beta$, $\gamma$, $\delta$, and $\zeta$ are parameters for approximating a square root function with an eighth degree polynomial, and $[x]:=[b]$ is assumed, and the processing circuitry further configured to:

calculate $[y']:=[x(\delta x+a-i)-j]$;

calculate $[y]:=[y'+(ix+j)]$;

calculate $[z']:=[y(\zeta y+b-k)+(c-1)x-m]$;

calculate $[z]:=[z'+(ky+lx+m)]$;

calculate $[w'/\gamma]:=[z(\alpha z+d-n/\gamma)+(\beta x+f-o/\gamma)y+(g-p)x+(H-q)/\gamma]$;

use the share value $\{r\}$ to calculate $[w'/\gamma]*(r'/\sqrt{2})\gamma$ when $r=1$ and $[w'/\gamma]*r'\gamma$ when $r=0$ to obtain a calculation result $[w']$; and calculate $[w]:=[w'+(nz+op+px+q)]$.

3. The secure computation apparatus used in the secure square root computation system according to claim 1.

4. A non-transitory computer recording medium on which a program for causing a computer to operate as the secure computation apparatus according to claim 3.

5. A secret normalization system for normalizing a share value $[a]$ of a value a to calculate a share value $[\sqrt{a}]$ of a square root of the value a, the secret normalization system comprising:

a plurality of secure computation apparatuses wherein $\lambda$ is a decimal point position of the value a, and $\lambda'$ is the smallest integer equal to or greater than $\lambda/2$, and each of the plurality of secure computation apparatuses comprises:

processing circuitry configured to:

generate, in cooperation with others of the secure computation apparatuses via communications including transmitting and receiving data over a network, a first sequence of share values $\{x_0\}, \ldots, \{x_{\lambda-1}\}$ of a flag sequence $x_0, \ldots, x_{\lambda-1}$ indicating a most significant bit of the value a;

calculate, in cooperation with others of the secure computation apparatuses via communications including transmitting and receiving data over the network, an exclusive logical sum of share values $\{x_{2i}\}$ and share values $\{x_{2i+1}\}$ of the first sequence of share values to obtain share values $\{y_i\}$ of a bit $y_i$ to generate a second sequence of share values $\{y_0\}, \ldots, \{y_{\lambda'-1}\}$ of a bit sequence $y_0, \ldots, y_{\lambda'-1}$ where i is an integer equal to or greater than 0 and smaller than $\lambda'$;

calculate, in cooperation with others of the secure computation apparatuses via communications including transmitting and receiving data over the network, an exclusive logical sum of all share values $\{x_j\}$ of the first sequence of share values to obtain a share value $\{r\}$ of a division flag r where j is an odd number equal to or greater than 0 and smaller than $\lambda$;

set, in cooperation with others of the secure computation apparatuses via communications including transmitting and receiving data over the network, a public value multiplier r', the public value multiplier r' being $\sqrt{2}$ when $\lambda$ is an odd number and 1 when $\lambda$ is an even number;

generate, in cooperation with others of the secure computation apparatuses via communications including transmitting and receiving data over the network, a share value $[c']$ of an inverse normalization multiplier c' obtained by bit-connecting the second sequence of share values $\{y_0\}, \ldots, \{y_{\lambda'-1}\}$ in order from the front;

generate, in cooperation with others of the secure computation apparatuses via communications including transmitting and receiving data over the network, a share value $[c]$ of a normalization multiplier c obtained by bit-connecting the first sequence of share values $\{x_0\}, \ldots, \{x_{\lambda-1}\}$ in reverse order; and calculate, in cooperation with others of the secure computation apparatuses via communications including transmitting and receiving data over the network, the share value $[b]$ obtained by multiplying the share value $[a]$ by the share value $[c']$.

6. The secure computation apparatus used in the secret normalization system according to claim 5.

7. A secure square root computation method executed by a secure square root computation system for receiving a share value $[a]$ of a value a as an input, and calculating a share value $[\sqrt{a}]$ of a square root of the value a, the secure square root computation system including a plurality of secure computation apparatuses, the secure square root computation method comprising:

generating, by processing circuitry of each of the plurality of secure computation apparatuses and in cooperation with others of the secure computation apparatuses via communications including transmitting and receiving data over a network, a first sequence of share values $\{x_0\}, \ldots, \{x_{\lambda-1}\}$ of a flag sequence $x_0, \ldots, x_{\lambda-1}$ indicating a most significant bit of the value a;

calculating, by the processing circuitry of the secure computation apparatus and in cooperation with others of the secure computation apparatuses via communications including transmitting and receiving data over the network, an exclusive logical sum of share values $\{x_{2i}\}$ and share values $\{x_{2i+1}\}$ of the first sequence of share values to obtain share values $\{y_i\}$ of a bit $y_i$ to generate a second sequence of share values $\{y_0\}, \ldots, \{y_{\lambda'-1}\}$ of a bit sequence $y_0, \ldots, y_{\lambda'-1}$ where i is an integer equal to or greater than 0 and smaller than $\lambda'$;

calculating, by the processing circuitry of the secure computation apparatus and in cooperation with others of the secure computation apparatuses via communications including transmitting and receiving data over the network, an exclusive logical sum of all share values $\{x_{2i}\}$ of the first sequence of share values to obtain a share value $\{r\}$ of a division flag r where j is an odd number equal to or greater than 0 and smaller than $\lambda$;

setting, by the processing circuitry of the secure computation apparatus and in cooperation with others of the secure computation apparatuses via communications including transmitting and receiving data over the network, a public value multiplier r', the public value multiplier r' being $\sqrt{2}$ when $\lambda$ is an odd number and 1 when $\lambda$ is an even number;

generating, by the processing circuitry of the secure computation apparatus and in cooperation with others of the secure computation apparatuses via communications including transmitting and receiving data over the network, a share value $[c']$ of an inverse normalization multiplier c' obtained by bit-connecting the second sequence of share values $\{y_0\}, \ldots,$ $\{y_{\lambda'-1}\}$ in order from the front;

generating, by the processing circuitry of the secure computation apparatus and in cooperation with others of the secure computation apparatuses via communications including transmitting and receiving data over the network, a share value [c] of a normalization multiplier c obtained by bit-connecting the first sequence of share values $\{x_0\}, \ldots, \{_{\lambda-1}\}$ in reverse order;

calculating, by the processing circuitry of the secure computation apparatus and in cooperation with others of the secure computation apparatuses via communications including transmitting and receiving data over the network, a share value [b] obtained by multiplying the share value [a] by the share value [c];

using, by the processing circuitry of each secure computation apparatus and in cooperation with others of the secure computation apparatuses via communications including transmitting and receiving data over the network, the share value [b], the share value $\{r\}$, and the public value multiplier r' to calculate $[\sqrt{b}]*$ $(r'/\sqrt{2})$ when r=1 and $[\sqrt{b}]*r'$ when r=0 to obtain a share value [w]; and calculating, by the processing circuitry of the secure computation apparatus and in cooperation with others of the secure computation apparatuses via communications including transmitting and receiving data over the network, the share value $[\sqrt{a}]$ obtained by shifting right a multiplication result of the share value [w] and the share value [c'] by $\lambda'$ bits, wherein $\lambda$ is a decimal point position of the value a, and $\lambda'$ is the smallest integer equal to or greater than $\lambda/2$.

\* \* \* \* \*